Patented Sept. 28, 1954

2,690,433

UNITED STATES PATENT OFFICE 2,690,433

PREPARATION OF CATALYSTS BY IMPREGNATION

Willem Frederik Engel and Han Hoog, Amsterdam, Netherlands

No Drawing. Application July 22, 1952, Serial No. 300,342

Claims priority, application Netherlands August 31, 1951

5 Claims. (Cl. 252—470)

The invention relates to an improvement in the preparation of catalysts having a metal of group VI in combination with a metal of group VIII of the periodic table deposited by solution impregnation on the surface of a foraminous carrier material. More particularly, the invention relates to a method whereby various foraminous catalyst carrier materials may be impregnated with soluble compounds of the mentioned metals in a more advantageous and practical manner to produce active and desirable catalysts. A particular aspect of the invention relates to the preparation of catalysts in which tungsten and/or molybdenum is combined with cobalt, nickel and/or copper.

The metals of group VI, and especially tungsten and molybdenum, and also many of their compounds, especially the oxides and sulfides, are known to catalyze a wide variety of reactions including, among others, hydrogenation, dehydrogenation, oxidation, desulfurization, isomerization and cracking. These metals and their catalytic compounds are, however, relatively costly. Also, they generally do not exist in forms having a stable and large surface area per unit weight. Consequently, it is the usual practice to use these catalytic materials in a diluted form in which the more costly and active catalytic agent is spread on the surface of a foraminous support material which is usually of a lower order of activity and may even be completely inactive catalytically.

While these metals may be combined with various foraminous carrier materials in a number of ways, the preferred method is to impregnate the forminous carrier materials with a soluble compound of the metal, e. g., chromic acid, ammonium molybdate, or the like, and then to calcine the composite to convert the metal compound to the oxide. The oxide may then, if desired, be converted to a different catalytically active compound by known suitable treatment, e. g., sulfidation, halogenation, reduction, or the like. The catalysts prepared by this method are known to offer a greater exposed surface of the desired catalytic compound primarily because by this method of preparation the metal is more evenly distributed over the available surface of the foraminous carrier material. When the metal compound is precipitated on the surface of the carrier material it is found that the catalytically active agent exists largely in the form of more or less isolated clumps or clusters of crystallites. The described preferred method of incorporating the metal by solution impregnation is excellent and presents no problem in the preparation of catalysts promoted with a group VI metal. Also, other catalytic metals, e. g., Fe, Co, Ni, Zn, Cu, V, Ti, Pt, etc., may be incorporated by this method without difficulty.

It is also known that the group VI metal promoters exert a more desirable catalytic activity when used in combination with certain other catalytically active metal promoters, such for example as those of group VIII and particularly iron, cobalt, nickel, or copper. However, when it is tried to incorporate these promoters with the group VI promoters by the usual impregnation method, difficulties are encountered.

On the one hand, it is desired to produce mechanically strong catalyst particles and this is best accomplished by resorting to the use of mechanically strong particles of carrier material such as granules of activated alumina and especially the preformed carrier materials such as the pressed or cast pellets of activated alumina, activated bauxite, "Celite" (ceramically bonded kieselguhr) "Alundum" (ceramically bonded alpha alumina) and the like. When such materials are impregnated by the desired usual impregnation method, it is usually found that the promoter metals penetrate and impregnate only the outer part of the pellets or granules. This may be due either to deposition of all of the metal from the imbibed liquid before the latter reaches the center of the particle, or it may be due to migration of the metal away from the center upon subsequent drying of the impregnated particles. The usual method of avoiding this condition is to impregnate a powdered carrier and then later form the pellets from the impregnated powder. This insures a uniform distribution of the metal promoters throughout the particles but has the disadvantages of being quite costly and generally producing particles of inferior mechanical strength. Such catalyst particles cannot be sintered or ceramically bonded without loss of catalytic activity.

It is now found that by the application of suitable agents in the solution used to incorporate the combinations of promoter elements the mentioned shortcomings of the prior methods can be substantially overcome. The penetration of the metal promoters into the center of preformed particles is improved, thereby producing a better and more even distribution.

The agents which we have found effective in the preparation of impregnated type catalysts of the type described are acyclic polyhydric alcohols. Of the acyclic polyols those of the group consisting of the tetritols, penitols and hexitols are specially suited. Thus, while such materials as glycerol exert some beneficial effect, such materials as erythritol, pentaerythritol, sorbitol, mannitol, inositol, arabitol, xylitol, dulcitol, iditol and their mixtures are superior and are preferred.

The polyhydric alcohols may contain one or more aldehyde groups in addition to the hydroxyl groups. The polyhydric alcohols containing an aldehyde group can be applied but are considerably less effective than the polyhydric alcohols devoid of aldehyde groups. All of the materials mentioned are composed of carbon, hydrogen and oxygen.

Some of the agents mentioned tend to reduce certain of the metal salts if the solution is heated. When using such agents the solution is not heated, e. g., to hasten solution, and/or is maintained at a temperature below that causing reduction.

Much improved results are already obtained when the solution used for impregnating the carrier contains as little as 5% of the polyhydric alcohol and generally it is not necessary to apply more than a 20% concentration to obtain the maximum possible effectiveness. Concentrations of about 10–15% are generally quite satisfactory.

The method of the invention is applicable and advantageous in the preparation of impregnated catalysts with any foraminous catalyst carrier material. Examples of suitable carrier materials are for instance, silica gel, kaolin, magnesium silicate, magnesium carbonate, magnesium oxide, aluminum oxide, bauxite, asbestos, activated carbon. The method is particularly advantageous when the catalyst is prepared with a carrier material which is highly microporous, i. e., having pores which on the average are less than 100 microns in diameter. Silica gel, activated carbon, and activated alumina are examples of microporous carrier materials. It is also particularly advantageous when preparing the catalyst from preformed pieces, e. g., pellets formed from powders.

The impregnation of the carrier material with the desired metals may be advantageously carried out as follows:

1. Make up an aqueous solution containing one of the mentioned agents, e. g., a 10% solution of pentaerythritol;
2. Dissolve in the resultant solution the desired amount of the desired water-soluble compound of the metal, e. g., molybdenum and/or tungsten;
3. Dissolve in water the desired amount of a salt of the second metal, e. g., nickel and/or cobalt;
4. Add the solution from step 3 to that of step 2 with stirring;
5. Soak the particles of the foraminous carrier material in the resulting solution, drain and dry.

By this method the maximum concentration of molybdenum and/or tungsten may be incorporated properly on the surface of the foraminous carrier material in a single impregnation step. It is also possible, however, to vary this procedure. For example, all or a part of the agent may be added to the second solution. Also, the agent may be added after the first metal compound has been dissolved. However, in this case maximum concentrations of the metal salts is fixed by the solubility in water. Also, the agent may be added after mixing the solutions of the two metals provided that this is done within a few minutes of mixing the solutions.

After the solution of the two or more metals is made up it is used to impregnate the carrier material. An excess of the solution may be used in which case the excess solution may be drained from the impregnated carrier material, or the excess solution may be evaporated from the impregnated carrier material. On the other hand, only such an amount of the solution may be applied as is taken up (absorbed) by the foraminous carrier material. In either case, the impregnated carrier material is then dried. The drying can be done in an oven, or in a kettle at atmospheric pressure, or under vacuum. The dried material is then calcined, e. g., at 450° C. to convert the impregnated water-soluble metal compound to the oxidic form.

As pointed out, it is most advantageous to impregnate preformed pieces of the carrier in which case the calcined product is ready for use. However, if desired, the impregnated carrier may at any time after drying be ground and/or formed into pellets of any desired size or shape, and/or it may be treated by one of the conventional chemical methods to convert the mixture of the metals into any desired catalytically active compound such as the reduced metals, the sulfides, the chlorides, the phosphates, or the like. If desired, the impregnation treatment may be repeated at any stage after drying to incorporate further amounts of the metals.

The difficulty, referred to above, is particularly pronounced when preparing the impregnated catalyst with the combinations of tungsten with nickel, tungsten with cobalt and molybdenum with cobalt. The difficulty is also dependent somewhat upon the ratio of the metals used. Thus, the tendency towards precipitation in the case of the combination of molybdenum and cobalt increases as the ratio of molybdenum to cobalt increases. The method of the invention is, therefore, particularly advantageous when preparing catalysts in which cobalt or nickel is used to promote molybdenum or tungsten, and particularly, where the molybdenum or tungsten predominates.

*Example I*

Undehydrated bauxite was powdered in a disintegrator and then screened to give a power having the following size analysis.

Quantity of particles larger than 420 micron 0% by weight
Quantity of particles larger than 297 micron 0.3% by weight
Quantity of particles larger than 210 micron 11.1% by weight
Quantity of particles larger than 177 micron 4.1% by weight
Quantity of particles larger than 149 micron 7.9% by weight
Quantity of particles larger than 74 micron 20.4% by weight
Quantity of particles larger than 44 micron 17.5% by weight
Quantity of particles smaller than 44 micron 38.1% by weight This powder was mechanically kneaded for 10 minutes at the same time with 15.8% by weight of water, and 4.2% by weight of $AlCl_3$.

The paste was extruded by means of an extrusion press. The extrudates were dried for 8 hours in air at 20° C. and afterwards heated for a period of 5 hours to 120° C. and kept at this temperature for 8 hours. The extrudates were then cut into pieces of 4 mm. long. The pieces obtained were first heated to 250° C. during 2 hours and then kept at this temperature for 5 hours, after which they were heated to 500° C. during 2 hours and then kept at 500° C. for a further 2 hours. By following this procedure the bound water of hydration was slowly expelled before the pieces were heated at 500° C.

The pieces obtained, measuring 5 x 4 mm., were impregnated with an aqueous solution of ammonium molybdate and cobalt nitrate, the following quantities being used:

138.2 g. of carrier material
41 cc. of aqueous solution with
16.5 g. of ammonium molybdate and
1.1 g. of cobalt as cobalt nitrate.

The solution was entirely absorbed by the carrier. After drying for 4 hours at 110° C. the composite was heated in nitrogen for 2 hours at 370° C.

The catalyst obtained contained the active material in a 0.2 mm. thick layer on the outside of the pieces. Thus the composition of the pieces was not homogeneous.

The pieces were then impregnated in the same way, except that a solution containing 8 g. of sorbitol in addition to the other ingredients was used. After drying for 4 hours at 110° C., calcination in air was carried out at 500° C. to remove any carbon-containing products formed from the sorbitol. The resulting catalyst pieces were impregnated with the active material right down to the core, so that their composition was homogeneous.

When the catalysts were used for the liquid phase desulphurization of a hydrocarbon oil both catalysts underwent a certain amount of erosion as a result of mechanical influences and this led to a loss of active material. In the case of the non-homogeneous catalyst this erosion resulted in a greater decrease in activity than in the case of the homogeneous catalyst prepared according to the invention.

*Example II*

Tablets of alumina 5 mm. in diameter and 4 mm. long were prepared as described in Example I and impregnated with solutions containing molybdenum in combination with cobalt and nickel with and without the addition of various agents. After affecting the impregnation the tablets were cut radially whereby the degree of penetration of the metals into the pellets could be seen and measured. There appeared to be two cases, namely one showing a sharp boundary at the innermost extent of penetration and the other showing a more or less vague boundary. The percentages of the cross sections of the tablets impregnated with the respective combinations of metal compounds are given in the following table. The letters S and V indicate that the boundary was sharp (S) or vague (V).

| Added Agent | Percent Impregnation | |
|---|---|---|
| | Co-Mo | Ni-Mo |
| None | 14 (S) | 14 (S) |
| glycerol | 40 (S) | 35 (S) |
| erythritol | 100 (V) | 100 (V) |
| pentaerythritol | 75 (S) | 60 (S) |
| sorbitol | 95 (V) | 100 (V) |
| mannitol | 80 (V) | 90 (V) |
| fructose | 30 (S) | 50 (V) |
| sorbose | 30 (S) | 30 (V) |
| saccharose | 35 (S) | 35 (S) |

*Example III*

Pellets of alumina prepared as described above were impregnated with a solution containing the combination of cobalt with molybdenum (30% solution) and varying amounts of sorbitol. The effect of the concentration of sorbitol in the solution upon the degree of penetration of the metals in the pellets is shown in the following table.

| Percent Sorbitol in Solution | 0 | 2 | 4 | 6 | 8 | 10 | 15 |
|---|---|---|---|---|---|---|---|
| Boundary (sharp or vague) | S | S | S | V | V | V | V |
| Penetration, mm | 0.2 | 0.5 | 0.6 | 1.0 | 1.6 | 2.0 | 2.2 |
| Percent of cross section impregnated | 14 | 35 | 50 | 65 | 85 | 95 | 98 |

We claim as our invention:

1. In the preparation of a catalyst containing an element of the left hand column of group VI of the periodical table of the elements and an element of group VIII of said table incorporated on the surface of a foraminous carrier material by impregnation with an aqueous solution, the improvement which comprises impregnating the foraminous carrier material with an aqueous acyclic polyhydric alcohol solution containing water soluble compounds of said metals, drying the resulting composite, and calcining the same, said polyhydric alcohol being composed of carbon, hydrogen and oxygen.

2. Process according to claim 1 further characterized in that said acyclic polyhydric alcohol is an acyclic polyhydric alcohol selected from the group consisting of tetritols, pentitols, and hexitols.

3. Process according to claim 1 further characterized in that said acyclic polyhydric alcohol is sorbitol.

4. Process according to claim 1 further characterized in that said acyclic polyhydric alcohol is erythritol.

5. Process according to claim 1 further characterized in that said acyclic polyhydric alcohol is mannitol.

References Cited in the file of this patent

UNITED STATES PATENTS

| Number | Name | Date |
|---|---|---|
| 2,034,077 | Arnold et al | Mar. 17, 1936 |
| 2,486,361 | Nahin et al | Oct. 25, 1949 |